Jan. 8, 1924.

J. E. VALADE

NUT LOCK

Original Filed May 13, 1922

1,480,318

INVENTOR
JOSEPH. E. VALADE.

BY Fetherstonhaugh
ATTYS.

Patented Jan. 8, 1924.

1,480,318

UNITED STATES PATENT OFFICE.

JOSEPH EMILE VALADE, OF COATICOOK, QUEBEC, CANADA.

NUT LOCK.

Application filed May 13, 1922, Serial No. 560,807. Renewed October 16, 1923.

*To all whom it may concern:*

Be it known that I, JOSEPH EMILE VALADE, a subject of the King of Great Britain, and resident of Baldwin's Mill, Coaticook, in the Province of Quebec, Dominion of Canada, have invented certain new and useful Improvements in Nut Locks, of which the following is a specification.

This invention relates to improvements in nut locks, and has for its objects to provide a means whereby the nut will be prevented from turning on the threaded shank of the bolt on which it is threaded.

Other objects are to provide nut locking means comprising a nut having a flange provided with teeth on its top face and formed integral with the nut and engaging a U-shaped member carrying a pawl in engagement with the teeth.

Other objects are to provide a nut lock that is simple in construction, not liable to go out of repair, and generally to adapt the several parts to better perform the functions required of them.

For a clear description of the several parts of my invention, reference is being had to the accompanying drawings, in which:—

In the drawings, like characters of reference indicate corresponding parts in all the figures.

Figure 1:
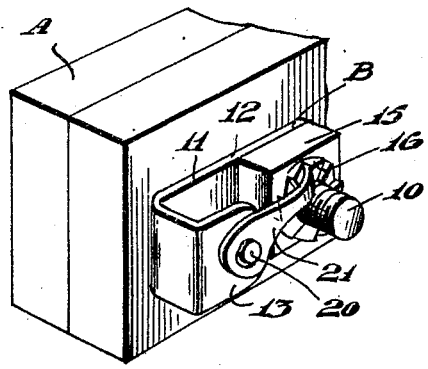
Figure 1 is a perspective view of the improved nut lock.
Figure 2:
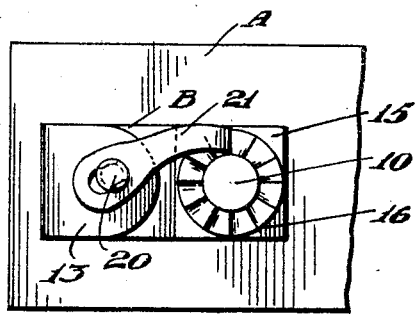
Figure 2 is a plan view of the same.
Figure 3:
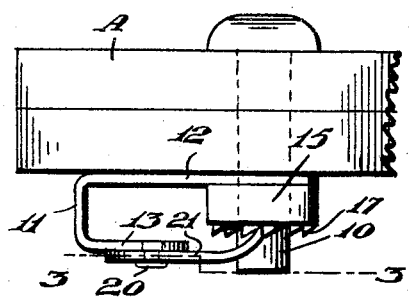
Figure 3 is a side elevation.
Figure 4:
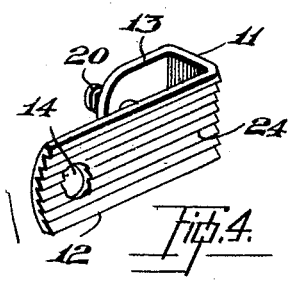
Figure 4 is a perspective view of the U-shaped member.
Figure 5:
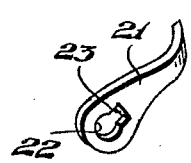
Figure 5 is a perspective view of the pawl.

Referring to the drawings, A represents two members of a machine designed to be fastened together by a bolt 10 provided with the improved nut locking means B.

The nut lock comprises a U-shaped member 11, the U-shaped member 11 having arms 12 and 13 unequal in length, the longer arm 12 of the U-shaped member is provided with orifice 14 designed to engage the threaded end of the bolt shank 10, and the nut 15 in threaded engagement with the bolt 10 engages the top face of the arm 12.

Figure 6:
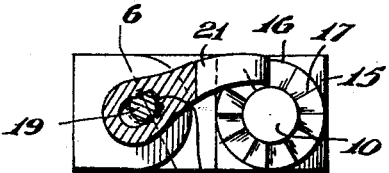
Figure 6 is a sectional view on the line 3—3 of Figure 3.
Figures 7, 8:
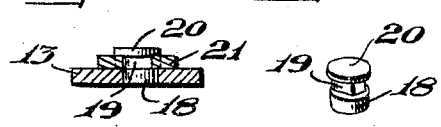
Figure 7 is a sectional view on the line 6—6, of Figure 6.
Figure 8 is a perspective view of the pin provided on the U-shaped member.

The nut 15 is provided on the top face thereof with a flange 16 formed integral therewith and provided on its top face with teeth 17. A shorter arm 13 of the U-shaped member 11 carries a pin 18 having a shank 19 squared on three of its faces as shown in Figure 6 and provided with a head 20.

The pawl 21 having an enlarged end provided with an orifice 22 formed with a squared recess 23 is in loose engagement with the shank 19 of the pin 18, and the remote end of the pawl is curved downwardly and tapered so as to suitably engage the teeth 17 of the flange 16 as clearly shown in the drawings.

When using this nut lock, the bolt 10 is put into engagement with the works A and the U-shaped member is positioned on the works having the orifice 14 thereof engaging the threaded end of the bolt, the nut 15 is then threaded over the bolt, until it engages the arm 12 of the U-shaped member, and the pawl 21 is then turned on the pin 18 and its curved end brought into engagement with the teeth 17 of the flange 16, when the nut 15 is slightly turned backward so as to shove the pawl 21 and cause the squared part of the shank 19 of the pin 18 to engage the squared recess 23 of the pawl, thereby preventing the pawl from any lateral movement whatever.

The arm 12 of the U-shaped member 11 is also provided on the bottom face thereof with corrugations 24, which engages the works A, and are forced downwardly and caused to bite into the works by the pressure of the nut 15 engaging the top face thereof.

It will thus be seen that when this improved nut lock is used, the nut 15 is prevented from any movement on the bolt 10, and can only be released by disengaging the squared portion of the shank 19 from the recess 23 provided in the pawl 21.

This nut lock is specially adapted to be used on binders or other agricultural machines, more adapted to undergoing hard stress on account of the unevenness of the ground on which they are usually employed.

As many changes could be made in the above construction, and many apparently widely different embodiments of my invention, within the scope of the claims, constructed without departing from the spirit or scope thereof, it is intended that all matter contained in the accompanying specification and drawing shall be interpreted as illustrative and not in a limiting sense.

What I claim as my invention is:

1. A nut lock comprising in combination with a bolt, a nut having a flange formed integral with the top face thereof, teeth on the top face of the nut, a U-shaped member having a long arm provided with an orifice designed to engage the bolt, and a short arm provided with a pin having three faces squared, a head on the pin, and a pawl pivotally mounted thereon engaging the teeth on the flange, the pawl being provided with orifices having a squared recess designed to engage the pin, as and for the purpose described.

2. The nut lock claimed in claim 1, in which the long arm of the U-shaped member is provided with corrugations on the under face thereof designed to engage the structure, as and for the purpose described.

In witness whereof I have hereunto set my hand in the presence of two witnesses.

JOSEPH EMILE VALADE.

Witnesses:
Jos. Dionne,
Lillian McDonald.